(12) United States Patent
Yamamura et al.

(10) Patent No.: US 10,995,384 B2
(45) Date of Patent: May 4, 2021

(54) STEEL FOR SOLID OXIDE FUEL CELLS AND MANUFACTURING METHOD THEREOF

(71) Applicant: HITACHI METALS, LTD., Tokyo (JP)

(72) Inventors: Kazuhiro Yamamura, Shimane (JP); Toshihiro Uehara, Shimane (JP); Shigenori Tanaka, Shimane (JP)

(73) Assignee: HITACHI METALS, LTD., Tokyo (JP)

(*) Notice: Subject to any disclaimer, the term of this patent is extended or adjusted under 35 U.S.C. 154(b) by 861 days.

(21) Appl. No.: 15/512,417

(22) PCT Filed: Sep. 30, 2015

(86) PCT No.: PCT/JP2015/077679
§ 371 (c)(1),
(2) Date: Apr. 20, 2017

(87) PCT Pub. No.: WO2016/052591
PCT Pub. Date: Apr. 7, 2016

(65) Prior Publication Data
US 2017/0275728 A1 Sep. 28, 2017

(30) Foreign Application Priority Data
Sep. 30, 2014 (JP) .............................. JP2014-199725

(51) Int. Cl.
*C21D 9/46* (2006.01)
*B21B 3/02* (2006.01)
(Continued)

(52) U.S. Cl.
CPC .................. *C21D 9/46* (2013.01); *B21B 1/22* (2013.01); *B21B 3/02* (2013.01); *C21D 1/26* (2013.01);
(Continued)

(58) Field of Classification Search
CPC ....................................................... C21D 9/46
See application file for complete search history.

(56) References Cited

U.S. PATENT DOCUMENTS 6,776,956 B2 * 8/2004 Uehara ................. C22C 38/004
148/325
2003/0063994 A1 4/2003 Uehara et al.
(Continued)

FOREIGN PATENT DOCUMENTS

EP 1298228 4/2003
EP 2700729 2/2014
(Continued)

OTHER PUBLICATIONS

Huh, M.Y. and Engler, O., 2001. Effect of intermediate annealing on texture, formability and ridging of 17% Cr ferritic stainless steel sheet. Materials Science and Engineering: A, 308(1-2), pp. 74-87. (Year: 2001).*

(Continued)

*Primary Examiner* — Jophy S. Koshy
(74) *Attorney, Agent, or Firm* — Rankin, Hill & Clark LLP

(57) ABSTRACT

There is provided a steel for solid oxide fuel cells which contains more than 0 and not more than 0.05 mass % of C, 0.05 mass % or less of N, 0.01 mass % or less of O, 0.2 mass % or less of Al, 0.15 mass % or less of Si, 0.1 to 1.0 mass % of Mn, 20.0 to 25.0 mass % of Cr, more than 0 mass % and not more than 1.0 mass % of Ni, 0.02 to 0.12 mass % of La, 0.1 to 0.5 mass % of Zr, 0.15 to 0.5 mass % of La+Zr, and Fe and impurities as a remainder. The following relational formula is satisfied, and an Fe and Zr-containing intermetallic compound viewed in a ferrite matrix is 1.1 % or less in terms of a visual field area ratio (Continued)

$5(7C+6N)/(7-4(7C+6N)) \leq Zr \leq 41(7C+6N)/(7+66(7C+6N))$.

6 Claims, 1 Drawing Sheet

(51) Int. Cl.

| | |
|---|---|
| *C22C 38/50* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *H01M 8/021* | (2016.01) |
| *B21B 1/22* | (2006.01) |
| *C21D 1/26* | (2006.01) |
| *C21D 6/00* | (2006.01) |
| *C21D 8/02* | (2006.01) |
| *H01M 8/124* | (2016.01) |

(52) U.S. Cl.
CPC ............. *C21D 6/004* (2013.01); *C21D 6/005* (2013.01); *C21D 6/008* (2013.01); *C21D 8/0205* (2013.01); *C21D 8/0236* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *H01M 8/021* (2013.01); *C21D 2211/004* (2013.01); *C21D 2211/005* (2013.01); *H01M 2008/1293* (2013.01); *Y02P 70/50* (2015.11)

(56) References Cited

U.S. PATENT DOCUMENTS

| | | | |
|---|---|---|---|
| 2011/0008200 A1* | 1/2011 | Kato | ................ C22C 38/06 420/39 |
| 2012/0177530 A1 | 7/2012 | Uehara | |
| 2014/0038064 A1 | 2/2014 | Uehara | |
| 2014/0216614 A1 | 8/2014 | Teraoka | |

FOREIGN PATENT DOCUMENTS

| | | | | |
|---|---|---|---|---|
| EP | 2871251 A1 | 5/2015 | | |
| JP | 06116686 | 4/1994 | | |
| JP | 2004269915 A2 | 9/2004 | | |
| JP | 2005320625 A2 | 11/2005 | | |
| JP | 2007016297 A2 | 1/2007 | | |
| JP | 2011-162863 | 8/2011 | | |
| JP | 2013001962 A2 | 1/2013 | | |
| JP | 2014031572 A2 | 2/2014 | | |
| JP | 2014139342 A2 | 7/2014 | | |
| WO | WO-2009110640 A1 * | 9/2009 | .......... C22C 38/001 |
| WO | 2011034002 A1 | 3/2011 | | |
| WO | 2012144600 A1 | 10/2012 | | |

OTHER PUBLICATIONS

Extended European Search Report dated Jul. 20, 2017 for EP Patent Application No. 15845681.4.
International Search Report dated Dec. 22, 2015 filed in PCT/JP2015/077679.
Extended European Search Report dated Jul. 21, 2017 for EP Patent Application No. 15845681.4.

* cited by examiner

STEEL FOR SOLID OXIDE FUEL CELLS AND MANUFACTURING METHOD THEREOF

TECHNICAL FIELD

The present invention relates to a steel for solid oxide fuel cells which is excellent in oxidation resistance, and to a manufacturing method thereof.

BACKGROUND ART

Solid oxide fuel cells operate at a high temperature of approximately 600 to 1000° C. Therefore, solid oxide fuel cells have excellent properties such as high power generation efficiency, reduced emissions of SOx, NOx, and $CO_2$, favorable responsivity to load variations, correspondence with fuel diversity, and compactness. Therefore, solid oxide fuel cells are expected to be applied to various power generation systems as an alternative to thermal power generation, such as a large-scale centralized power source, a suburban distributed power source, a house dispersed power source, and an auxiliary power source such as an automobile. Among these, in a component for solid oxide fuel cells, such as a separator, an interconnector, and a current collector, ceramics have been often used. This is because since the mainstream of operating temperatures was originally a high temperature of approximately 1000° C., properties such as oxidation resistance, electric conductivity, and a thermal expansion coefficient close to an electrolyte, an anode and a cathode were required.

However, ceramics is hard to process, and expensive. Also, in recent years, the operating temperature of solid oxide fuel cells has decreased to approximately 600 to 900° C. Under such circumstances, for example, research for using, in a separator component or the like, a metal component which is less expensive than ceramics and has favorable workability and excellent oxidation resistance is actively conducted.

The metal component which is used for the above-described solid oxide fuel cells is required to have excellent oxidation resistance. The present applicant has also proposed a ferrite-based stainless steel which is excellent in oxidation resistance, in JP-A-2007-16297 (Patent Literature 1), JP-A-2005-320625 (Patent Literature 2), WO 2011/034002 A (Patent Literature 3), WO 2012/144600 A (Patent Literature 4), and the like.

CITATION LIST

Patent Literature

Patent Literature 1: JP-A-2007-016297
Patent Literature 2: JP-A-2005-320625
Patent Literature 3: WO 2011/034002 A
Patent Literature 4: WO 2012/144600 A

SUMMARY OF INVENTION

Problems to be Solved by the Invention

The steel for solid oxide fuel cells which has been proposed by the present applicant has excellent oxidation resistance and electrical conductivity. It is noted that as described in Patent Literature 3, carbon (C) and nitrogen (N) are an element which is regulated to be low as an element causing oxidation resistance to deteriorate. According to the research conducted by the present inventor, the contents of carbon and nitrogen in the steel for solid oxide fuel cells can be reduced by vacuum refining a material which contains an extremely small amount of carbon and nitrogen.

However, the present inventors drastically reduced the contents of C and N in the steel for solid oxide fuel cells according to Patent Literatures 1 to 4, and understood that there is a case in which oxidation resistance is not necessarily drastically improved. It was newly understood that this is particularly significant in a thin plate which is made of a Zr-containing alloy and has a plate thickness of 0.5 mm or less. Zr has the function of suppressing the growth of an oxide layer, densifying an oxide layer, and improving the adhesion of an oxide layer.

An object of the present invention is to provide a steel for solid oxide fuel cells which contains Zr and has a composition balance which allows excellent oxidation resistance to be stably obtained.

Solutions to the Problems

The present inventor conducted research in detail on the composition and the microstructure which enable favorable oxidation resistance to be stably obtained in a steel for solid oxide fuel cells which contains Zr.

As a result, the present inventor found that favorable oxidation resistance can be stably obtained by suppressing the amount of an Fe and Zr-containing intermetallic compound viewed in a ferrite matrix to be low. Thus, the present invention has been achieved.

That is, a steel for solid oxide fuel cells according to the present invention contains more than 0 and not more than 0.05 mass % of C, 0.050 mass % or less of N, 0.01 mass % or less of O, 0.15 mass % or less of Al, 0.15 mass % or less of Si, 0.1 to 1.0 mass % of Mn, 20.0 to 25.0 mass % of Cr, more than 0 mass % and not more than 1.0 mass % of Ni, 0.02 to 0.12 mass % of La, 0.1 to 0.5 mass % of Zr, 0.15 to 0.5 mass % of La+Zr, and Fe and impurities as a remainder. The following relational formula is satisfied, and an Fe and Zr-containing intermetallic compound viewed in a ferrite matrix is 1.1 mass % or less in terms of a visual field area ratio.

$$5(7C+6N)/(7-4(7C+6N)) \le Zr \le 41(7C+6N)/(7+66(7C+6N))$$

The steel for solid oxide fuel cells preferably further contains 0.5 to 2.0 mass % of Cu and 1.0 to 3.0 mass % of W, and contents of the Mn and the Cr are Mn: 0.1 to 0.4 mass % and Cr: 22.0 to 25.0 mass %.

The steel for solid oxide fuel cells according to any of the above description more preferably has a thickness of 0.5 mm or less.

Also, the manufacturing method of the steel for solid oxide fuel cells according to the present invention includes a cold rolling step of performing cold rolling with a cold molding material having the above-described composition, an intermediate annealing step of performing annealing during the cold rolling step at 800 to 1100° C., and a final annealing step of performing final annealing at 750 to 1050° C. to a cold rolled material having been subjected to final cold rolling of 30% or more, so that an Fe and Zr-containing intermetallic compound viewed in a ferrite matrix becomes 1.1% or less in terms of a visual field area ratio.

Effects of the Invention

According to the steel for solid oxide fuel cells of the present invention, decrease in performance of fuel cells when used for an extended time period can be stably suppressed particularly by stably improving the oxidation resistance of the steel for solid oxide fuel cells which contains Zr. Also, the properties of electrical conductivity and small differences in thermal expansion between an electrolyte, an anode material and a cathode material are maintained as they are. Furthermore, such properties are maintained even in a thin plate. Therefore, when the steel for solid oxide fuel cells is used as a separator, an interconnector, a current collector, and the like, which have the strictest requirement properties as a component made of a metal material, among the components of solid oxide fuel cells, it can significantly contribute to the improvement in durability when used for an extended time period and in performance.

DESCRIPTION OF EMBODIMENTS

Figure 1:
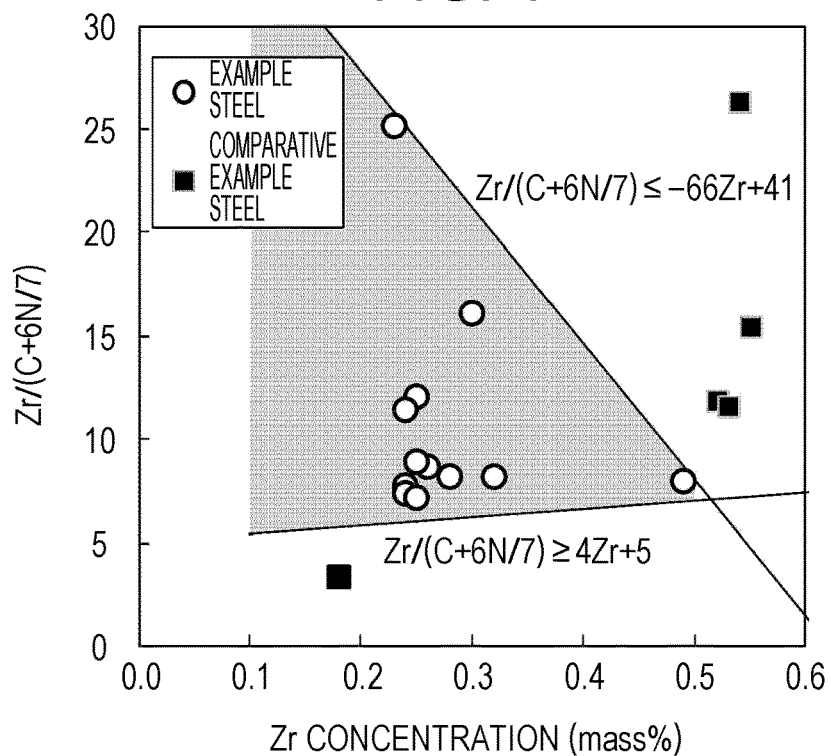
FIG. 1 is a diagram illustrating the chemical compositions of examples and comparative examples.

As described above, an important feature of the present invention is that an appropriate microstructure which significantly improves oxidation resistance in a steel for solid oxide fuel cells was found. The present invention will be described in detail below.

<Microstructure>

As described above, the present invention needs to contain Zr. The addition of a small amount of Zr allows for suppression of the growth of an oxide layer, densification of an oxide layer, and improvement of the adhesion of an oxide layer. Therefore, Zr has the effect of drastically improving the oxidation resistance and the electrical conductivity of an oxide layer. Meanwhile, Zr generates an intermetallic compound together with Fe. It is noted that an Fe and Zr-containing intermetallic compound as described herein is an intermetallic compound which is generally represented by the chemical formula $Fe_2Zr$ and is referred to as a Laves phase. This compound sometimes contains another element, for example, Cr.

According to the knowledge of the present inventors, it became apparent that as the precipitation amount of the Fe and Zr-containing intermetallic compound increases, oxidation resistance deteriorates. Although a detailed reason for this is not apparent, it can be estimated as follows.

As described above, Zr solved in an alloy can provide the above-described effect of improving oxidation resistance. However, it is considered that as the Fe and Zr-containing intermetallic compound is precipitated, the amount of effective Zr solved in an alloy matrix decreases. As a result, it is considered that the effect of improving oxidation resistance, which is originally exerted in an appropriately adjusted alloy composition, was reduced.

When the phase of the above-described Fe and Zr-containing intermetallic compound exceeds 1.1% in a continuous manner at crystal grain boundaries in a ferrite matrix, deterioration of oxidation resistance is increased. Therefore, the Fe and Zr-containing intermetallic compound is 1.1% or less.

Also, when measuring a visual field area ratio, it is empirically sufficient that the area of a visual field area of 0.25 $mm^2$ is observed using an electron probe microanalyzer (EPMA) to measure an area ratio.

Next, the reason why the range for the content of each element in the steel for solid oxide fuel cells according to the present invention was defined will be described.

<C: More than 0 and not More than 0.05%>

C is one of the most important elements to be defined for suppressing the deterioration of oxidation resistance. C is, as described above, an element which combines with Cr to form a Cr carbide, thereby reducing the amount of Cr solved in a matrix phase to lower oxidation resistance. Therefore, for improving oxidation resistance, reduction of C is effective. In the present invention, the range of C is limited to 0.05% or less. It is noted that the upper limit of C is preferably 0.040%, more preferably 0.030%, and further preferably 0.025%.

On the other hand, when C is excessively low in the Zr-containing steel for solid oxide fuel cells according to the present invention, redundant Zr may still remain even after a Zr carbide (when N also exits, a Zr carbonitride) is formed, and furthermore, Zr is solved in a ferrite matrix. Redundant Zr reacts with Fe to form and precipitate an intermetallic compound such as a Laves phase, thereby reducing oxidation resistance. Therefore, C needs to exceed 0%. The lower limit of C is preferably 0.001%.

<N: 0.050% or Less>

N is an element which combines with Cr to form a Cr nitride, thereby reducing the amount of Cr solved in a matrix phase to deteriorate oxidation resistance. Therefore, N is preferably contained in a small amount. However, for reducing nitrogen, solution needs to be performed with a raw material containing a small amount of nitrogen, or nitrogen in a melted steel needs to be reduced by ladle refining. Therefore, reduction of nitrogen leads to increase of a manufacturing cost. For improving oxidation resistance, lowering N is effective. Also, N reacts with C and Zr to form a Zr carbonitride, thereby impairing hot workability and cold workability. Therefore, in the present invention, the range of N is limited to 0.050% or less. The upper limit of C is preferably 0.040%, more preferably 0.030%, and further preferably 0.020%.

On the other hand, when N is excessively low in the Zr-containing steel for solid oxide fuel cells according to the present invention, redundant Zr may still remain even after a Zr carbide (when C also exits, a Zr carbonitride) is formed, and furthermore, Zr is solved in a ferrite matrix. Redundant Zr reacts with Fe to form and precipitate an intermetallic compound such as a Laves phase, thereby reducing oxidation resistance. Therefore, N needs to exceed 0%. The lower limit of N is preferably 0.001%.

<Zr: 0.1 to 0.5%>

The addition of a small amount of Zr allows for suppression of the growth of an oxide layer, densification of an oxide layer, and improvement of the adhesion of an oxide layer. Therefore, Zr has the effect of drastically improving the oxidation resistance and the electrical conductivity of an oxide layer. When Zr is less than 0.1%, the effect of suppressing the growth of an oxide layer and improving the denseness and adhesion of an oxide layer is reduced. On the other hand, when more than 0.5% of Zr is added, a coarse compound containing Zr is formed in a large amount. Accordingly, there is a risk that hot workability and cold workability may deteriorate. For this reason, Zr is defined to be 0.1 to 0.5%. The lower limit of Zr is preferably 0.15%, and more preferably 0.20%. Also, the upper limit of Zr is preferably 0.45%, and more preferably 0.4%.

<La: 0.02 to 0.12%>

The addition of a small amount of La allows for suppression of the growth of an oxide layer, densification of an oxide layer mainly containing Cr, and improvement of the adhesion of an oxide layer. Since this causes favorable oxidation resistance to be exerted, adding La is indispensable. When the added amount of La is less than 0.02%, the effect of improving the denseness and adhesion of an oxide layer is reduced. On the other hand, when the added amount of La is more than 0.12%, inclusions such as a La-containing oxide may increase. Accordingly, there is a risk that hot workability may deteriorate. Therefore, La is defined to be 0.02 to 0.12%. The lower limit of La is preferably 0.03%, and more preferably 0.04%. Also, the upper limit of La is preferably 0.11%, and more preferably 0.10%.

<La+Zr: 0.15 to 0.5%>

Both the above-described La and Zr have the effect of improving excellent oxidation resistance at high temperature. Therefore, in the present invention, the effect can be more exerted by adding both La and Zr. In that case, when the total amount of La and Zr is less than 0.15%, the effect of improving oxidation resistance is reduced. On the other hand, when the total added amount of La and Zr exceeds 0.5%, the amount of a La and Zr-containing compound to be generated increases. Accordingly, there is concern that hot workability and cold workability could be reduced. Therefore, the total amount of La and Zr is 0.15 to 0.5%. The lower limit of La+Zr is preferably 0.20%.

<O: 0.01% or Less>

O is one of the important elements to be limited in order to compensate for the deterioration of oxidation resistance. O, together with Al, Si, Mn, Cr, Zr, La and the like, forms oxide-based inclusions. Therefore, O not only impairs hot workability and cold workability but also reduces the solved amount of La, Zr, and the like which significantly contribute to the improvement of oxidation resistance. Therefore, O reduces the effect by these elements of improving oxidation resistance. Thus, O is preferably limited to 0.01% or less. O is preferably 0.008% or less, and more preferably 0.005% or less.

<Al: 0.15% or Less>

Al is added in a small amount for deoxidation thereby to reduce the amount of oxygen in steel. Accordingly, Al increases the solved amount of Zr and La which are effective in improving oxidation resistance, thereby to improve oxidation resistance. Therefore, Al is one of the important elements. Also, Al forms particulate and needle-like $Al_2O_3$ near a Cr oxide layer in the microstructure at operating temperatures of solid oxide fuel cells. Accordingly, outward diffusion of Cr becomes non-uniform, thereby inhibiting the stable formation of a Cr oxide layer. As a result, oxidation resistance deteriorates. Therefore, in the present invention, Al is limited to the range of 0.15% or less. In order to surely obtain the above-described effect which is exerted when Al is reduced, Al is defined to be preferably 0.1% or less. Al is further preferably 0.05% or less.

<Si: 0.15% or Less>

Si is added in a small amount for deoxidation thereby to reduce the amount of oxygen in steel. Accordingly, Si increases the solved amount of Zr and La which are effective in improving oxidation resistance. Therefore, Si is one of the important elements. Also, Si forms layer-like $SiO_2$ in the vicinity of the interface between a Cr oxide layer and a matrix material at operating temperatures of solid oxide fuel cells. Since the electrical resistivity of $SiO_2$ is higher than that of an oxide of Cr, electric conductivity decreases. Also, similarly to the above-described formation of $Al_2O_3$, the stable formation of a Cr oxide layer is inhibited, which causes oxidation resistance to deteriorate. Therefore, in the present invention, Si is limited to the range of 0.15% or less. In order to more surely obtain the above-described effect which is exerted when Si is reduced, the upper limit of Si is preferably 0.10% or less. The upper limit of Si is more preferably 0.08% or less, further preferably 0.07% or less, and further preferably 0.06% or less.

<Mn: 0.1 to 1.0%>

Mn, together with Cr, forms a spinel-type oxide at operating temperatures of solid oxide fuel cells, thereby improving conductivity at high temperature. Therefore, Mn is an important element. The Mn-containing spinel-type oxide layer is formed outside (on the front surface side of) a $Cr_2O_3$ oxide layer. Here, it is known that Cr evaporated from the $Cr_2O_3$ surface oxide layer is deposited on a ceramics component of a solid oxide fuel cell to form a composite oxide which causes the performance of the fuel cell to deteriorate. This spinel-type oxide layer has the protection effect of preventing the evaporation of Cr from the $Cr_2O_3$ surface oxide layer of the steel for solid oxide fuel cells. Also, this spinel-type oxide layer usually has an oxidation speed which is higher than that of $Cr_2O_3$. Therefore, this spinel-type oxide layer has the effect of maintaining the smoothness of an oxide layer thereby to prevent the reduction of contact resistance and the evaporation of Cr which is hazardous to fuel cells, while it disadvantageously acts on oxidation resistance itself. For this reason, at least 0.1% of Mn is necessary. The lower limit of Mn is preferably 0.2%.

On the other hand, when Mn is excessively added, the growth speed of an oxide layer is increased. Accordingly, oxidation resistance deteriorates. Thus, the upper limit of Mn is 1.0%. The upper limit of Mn is preferably 0.6%, and more preferably 0.4%.

<Cr: 20.0 to 25.0%>

Cr forms a Cr oxide layer which is represented by dense $Cr_2O_3$, at operating temperatures of solid oxide fuel cells, thereby achieving excellent oxidation resistance. Therefore, Cr is fundamentally a necessary element. Also, Cr is an important element for maintaining electrical conductivity. For stably obtaining favorable oxidation resistance and electrical conductivity, at least 20.0% of Cr is necessary.

However, excessive addition of Cr is not only not significantly effective in improving oxidation resistance but also leads to the deterioration of workability. Therefore, the upper limit of Cr is limited to 25.0%. The lower limit of Cr is preferably 21.0%, and more preferably 22.0%.

<Ni: More than 0% and not More than 1.0%>

When Ni is added in a small amount, it has the effect of improving toughness. On the other hand, since Ni is an element which generates austenite, excessive addition of Ni is likely to form the two-phase structure of ferrite-austenite, causing thermal expansion coefficient to increase. Also, when manufacturing a steel which includes as a matrix phase a ferrite phase as in the present invention, for example, the use of a melted raw material of a recycle material sometimes causes Ni to be unavoidably mixed in. When the content of Ni becomes excessively high, there is concern that a thermal expansion coefficient could increase, causing reduction of bondability with ceramics-based components. Therefore, it is not preferable that a large amount of Ni is added or mixed in. Therefore, in the present invention, Ni is defined to be more than 0% and not more than 1.0%. The upper limit of Ni is preferably 0.8%, and further preferably 0.7%.

It is noted that in the present invention, when Cu is contained as described later, there is concern that hot shortness could cause hot workability to decrease. For suppressing this, adding a small amount of Ni is effective. It is noted that when the effect of improving hot workability is required, the lower limit of Ni when Cu is contained is preferably 0.1%, more preferably 0.2%, and further preferably 0.3%.

<Cu: 0.5 to 2.0%>

The steel for solid oxide fuel cells according to the present invention includes a Cr oxide layer having a two-layer structure in which an Mn-containing spinel-type oxide layer is formed on a $Cr_2O_3$ oxide layer, at an operating temperature of approximately 700 to 900° C.

Cu densifies the Mn-containing spinel-type oxide layer which is formed on the $Cr_2O_3$ oxide layer. Therefore, Cu has the effect of further suppressing evaporation of Cr from the $Cr_2O_3$ oxide layer. However, when the added amount of Cu is excessively small, the effect of further suppressing the evaporation of Cr also becomes insufficient. For this reason, in order to exert the effect of suppressing the evaporation of Cr by the addition of Cu, 0.5% or more of Cu is added. However, when more than 2.0% of Cu is added, a Cu phase is precipitated in a matrix phase. A dense Cr oxide becomes unlikely to be formed in a place where the Cu phase exists, therefore, decrease in oxidation resistance may be caused. Decrease in hot workability, and destabilization of a ferrite structure may be also caused by Cu precipitation. Therefore, Cu was defined to be 0.5 to 2.0%. The lower limit of Cu is preferably 0.7%, and further preferably 0.8%. The upper limit of Cu is preferably 1.5%, and further preferably 1.3%.

<W: 1.0 to 3.0%>

In general, as an element which exerts the same operation and effect as W for solid solution strengthening, Mo is known. However, W has the higher effect of suppressing outward diffusion of Cr when it is oxidized at operating temperatures of solid oxide fuel cells, than Mo. This is significantly effective particularly in a thin plate which is likely to have reduced oxidation resistance, and has the effect of drastically improving the oxidation properties of a thin plate. Therefore, for expressing the improvement in oxidation resistance by the addition of W, W can be added in an amount of 1.0 to 3.0% in the present invention.

The addition of W suppresses the outward diffusion of Cr. Accordingly, the reduction of the Cr amount inside alloy after a Cr oxide layer is formed can be suppressed. Also, W can prevent abnormal oxidation of alloy, so that excellent oxidation resistance is maintained. Such an effect of improving oxidation resistance by the addition of W is further increased by simultaneously increasing the Cr amount. Therefore, it is preferable that the lower limit of the Cr amount is increased while W is added. However, when more than 3.0% of W is added, the effect is not further increased, while hot workability deteriorates. Therefore, W is 3.0% or less. It is noted that the upper limit of W is preferably 2.5%, and further preferably 2.3%. The lower limit of W is preferably 1.5%, and further preferably 1.7%.

In the present invention, Fe and impurities are included other than the above-described elements. Hereinafter, representative impurities and preferable upper limits thereof will be indicated. It is noted that since each element is an impurity element, the lower limit thereof is preferably 0%.

<Mo: 0.2% or Less>

Mo reduces oxidation resistance. Therefore, Mo is not positively added, and limited to 0.2% or less.

<S: 0.015% or Less>

S, together with a rare earth element, forms a sulfide-based inclusion thereby to reduce the amount of a rare earth element which is effective in terms of oxidation resistance and to reduce oxidation resistance. Furthermore, S deteriorates hot workability and surface texture. Therefore, S is preferably 0.015% or less. S is more preferably 0.008% or less.

<P: 0.04% or Less>

P is an element which is more likely to be oxidized than Cr which forms an oxide layer, and deteriorates oxidation resistance. Therefore, P is limited to preferably 0.04% or less. P is preferably 0.03% or less, further preferably 0.02% or less, and further preferably 0.01% or less. However, when Cu or W is contained, the oxidation resistance improvement effect by the element allows P to somewhat increase in amount. Thus, P is limited to preferably 0.04% or less, and more preferably 0.03% or less.

<B: 0.003% or Less>

B increases the growth speed of an oxide layer at a high temperature of approximately 700° C. or higher, and deteriorates oxidation resistance. Also, B increases the surface roughness of an oxide layer and decreases the contact area between an oxide layer and an anode or a cathode. Thus, B deteriorates contact resistance. Therefore, B is limited to preferably 0.003% or less, and preferably reduced to 0% as much as possible. The upper limit is preferably 0.002% or less, and further preferably less than 0.001%.

<H: 0.0004% or Less>

When H excessively exists in an Fe—Cr-based ferrite matrix phase, it is likely to gather in a defected portion such as grain boundaries. Therefore, H is sometimes embrittled by hydrogen, causing the generation of cracks during manufacture. For this reason, H is preferably limited to 0.0004% or less. H is further preferably 0.0003% or less.

<Relational Formula>

In the present invention, C, N and Zr for ensuring favorable oxidation resistance are closely related to each other, and are required to satisfy the following relational formula.

$$5(7C+6N)/(7-4(7C+6N)) \leq Zr \leq 41(7C+6N)/(7+66(7C+6N)) \quad (1)$$

It is noted that Zr, C and N in the relational formula indicate mass % of Zr, C and N respectively.

The composition ranges of C, N and Zr in the steel for solid oxide fuel cells according to the present invention are defined by the compound phase precipitated in the microstructure. The expression in the relational formula indicates indices which represent the ranges of C, N and Zr for suppressing the precipitation of the compound phase which is hazardous to oxidation resistance. Here, the compound which is hazardous to oxidation resistance refers to a Cr carbide and an intermetallic compound containing Fe and Zr, which can be precipitated at around an operating temperature or can be remained during a manufacturing step. This relational formula is derived from the result of intensive research by the present inventors on the precipitation situation of an intermetallic compound and a carbide, the magnitude of an oxidation weight gain, and the relationship with a chemical component, in a plurality of steels for solid oxide fuel cell, and will be described by FIG. 1.

In the steel for solid oxide fuel cells according to the present invention, C and N combine with Zr to form a Zr carbonitride (Zr (C,N)). The formation of Zr (C,N) has the effect of reducing C and N in an alloy matrix phase thereby to improve oxidation resistance, workability, and the like. On the other hand, when the amounts of C and N in an alloy matrix phase are excessively reduced, decrease in oxidation resistance or the like is conversely invited. Also, when the amount of Zr is insufficient, and the amounts of C and N in an alloy matrix phase cannot be sufficiently reduced, decrease of oxidation resistance is invited as well. That is, an optimum range exists for the balance between the amounts of C, N and Zr.

The present inventors paid attention on the composition ratio for forming Zr (C,N), and adopted Zr/(C+6N/7) as an index for the balance among C, N, and Zr, as the value in consideration of the atomic weights of C and N. Subsequently, as illustrated in FIG. 1, the present inventors summarized the relationship between the Zr amount and Zr/(C+6N/7) in the steel for solid oxide fuel cells for which they conducted research, and compared the observation result of a microstructure and the magnitude of an oxidation weight gain. As a result, it was found that an optimum ranges for C, N and Zr can be explained by the following two formulae.

$$Zr/(C+6N/7) \geq 4Zr+5 \qquad (2)$$

$$5(7C+6N)/(7-4(7C+6N)) \leq Zr \qquad (2)'$$

When $Zr/(C+6N/7)$ is less than the lower limit defined by relational formula (2) illustrated in FIG. 1, Zr which is necessary for forming a Zr carbonitride becomes insufficient. Therefore, redundant C and N combine with Cr in steel to form a Cr carbide and a Cr nitride. As a result, the amount of effective Cr in a matrix material decreases, leading to the decrease in oxidation resistance of the steel for solid oxide fuel cells. Therefore, Zr, C and N preferably satisfy relational formula (2). It is noted that relational formula (2)' can be obtained by summarizing relational formula (2) for Zr.

$$Zr/(C+6N/7) \leq -66Zr+41 \qquad (3)$$

$$Zr \leq 41(7C+6N)/(7+66(7C+6N)) \qquad (3)'$$

When $Zr/(C+6N/7)$ is more than the upper limit defined by relational formula (3) illustrated in FIG. 1, redundant Zr is still generated in the steel for solid oxide fuel cells even after a Zr carbonitride is formed. At this time, redundant Zr combines with Fe in steel to form an Fe and Zr-containing intermetallic compound in a ferrite matrix. Such an intermetallic compound reduces the effective Zr concentration in the alloy matrix, resulting in the reduction in oxidation resistance of the steel for solid oxide fuel cells. Therefore, Zr preferably satisfies relational formula (3). It is noted that relational formula (3)' can be obtained by summarizing relational formula (3) for Zr.

Relational formula (1) is obtained by summarizing relational formula (2)' and relational formula (3)' obtained as described above.

<Thickness 0.5 mm or Less>

The steel for solid oxide fuel cells according to the present invention is provided as a steel for solid oxide fuel cells by rolling. The plate thickness of the steel is preferably 0.5 mm or less. In general, it is known that the oxidation resistance of alloy which is used under the high temperature environment decreases as the plate thickness becomes thinner, and more significantly reflects the properties of an alloy material. According to the present invention, oxidation resistance in a thin plate can be particularly improved by achieving the above-described alloy composition and alloy structure. Therefore, the upper limit of the plate thickness of the steel for solid oxide fuel cells according to the present invention is preferably 0.5 mm. It is noted that obviously, even when the plate thickness is more than 0.5 mm, oxidation resistance of the steel for solid oxide fuel cells can be improved by achieving the alloy composition and alloy structure according to the present invention.

The steel for solid oxide fuel cells according to the present invention has properties in terms of not only its alloy composition but also its alloy structure. However, the alloy structure is not uniquely determined only by the alloy composition. The manufacturing method thereof is extraordinarily important.

<Cold Rolling Material>

First, a cold rolling material having a composition defined by the above-described present invention is subjected to cold rolling (cold rolling step). As a cold rolling material, there may be used a hot-rolled material having a thickness of approximately 2 to 5 mm. This cold rolling material is repeatedly subjected to annealing and cold rolling to obtain a required thickness.

<Intermediate Annealing Step>

The annealing during the cold rolling step according to the present invention is performed at 800 to 1100° C. An object of this is to remove strain introduced by cold rolling for softening a cold-rolled material, thereby to prevent cracking of a final cold-rolled material. Also, in the steel for solid oxide fuel cells according to the present invention, the Fe and Zr-containing intermetallic compound has the above-described alloy composition. Accordingly, the precipitation thereof can be ideally suppressed. However, the precipitation of the Fe and Zr-containing intermetallic compound inside steel under the influence of segregation is sometimes accepted when a large-sized steel ingot is industrially manufactured. For this reason, when a cold rolling material having the above-described composition is used, intermediate annealing is performed for the purpose of solving the Fe and Zr-containing intermetallic compound.

When the annealing temperature is lower than 800° C., there is a risk that a cold-rolled material may not be sufficiently softened, causing the occurrence of cracking during final rolling. Furthermore, when a large amount of an Fe and Zr-containing intermetallic compound has been precipitated, the Fe and Zr-containing intermetallic compound cannot be sufficiently solved. On the other hand, when the annealing step is performed at the temperature higher than 1100° C., crystal grains of a cold-rolled material become coarsened. For this reason, the crystal grains does not become fine even when final cold rolling and final annealing are performed. In general, a steel for solid oxide fuel cells is provided as a component for solid oxide fuel cells by various plastic processes represented by press processing. When crystal grains are coarse, not only the plastic processes cause cracking to be likely to occur, but also the strength and toughness of a steel strip for solid oxide fuel cells may be reduced. Thus, the intermediate annealing temperature is 800° C. or higher and 1100° C. or lower, such that the crystal grains of the steel for solid oxide fuel cells become fine. The temperature range for the intermediate annealing is preferably 820 to 1050° C., and more preferably 850 to 1000° C.

<Final Cold Rolling>

The final cold rolling is defined to be 30% or more in the present invention in order to introduce sufficient strain into a steel strip for solid oxide fuel cells so that subsequent final annealing promotes re-crystallization to form fine crystal grains. As described above, the crystal grains of the steel for solid oxide fuel cells are preferably fine, and final cold rolling of 30% or more is performed. The final cold rolling is preferably 35% or more, and more preferably 40% or more. It is noted that the upper limit of the rolling is not particularly defined. However, when the cold rolling of more than 90% is performed, cracking occurs on the end portion of a steel strip. Accordingly, there is a risk that yields may be reduced. For this reason, when the steel for solid oxide fuel cells which is thinner is required to be manufactured, the thickness of a material to be subjected to final cold rolling is preferably adjusted by cold rolling and intermediate annealing such that the final rolling becomes 90% or less.

<Final Annealing>

Also, in the present invention, the cold-rolled material having been subjected to final cold rolling is subjected to final annealing at 750 to 1050° C. in order to remove strain in the steel for solid oxide fuel cells to obtain fine crystal grains. After the final annealing, there is not any step for controlling the crystal structure. Therefore, in order to obtain a finally obtained steel for solid oxide fuel cells which has the microstructure of fine crystal grains, the final annealing may be performed at a temperature of the intermediate annealing temperature or lower for suppressing the growth of crystal grains. Thus, the temperature range of the final annealing is 750 to 1050° C. This temperature range is preferably 780 to 1000° C.

It is noted that the atmosphere during both of the intermediate annealing and the final annealing is preferably inert gas such as $N_2$ or a non-oxidizing atmosphere containing $H_2$ and the like. Also, when the cooling speed after the intermediate annealing and the final annealing is slow, there is a risk that the Fe and Zr-containing intermetallic compound may be precipitated again during cooling. For this reason, the cooling speed after annealing is preferably 50° C./h or higher. The cooling speed is more preferably 100° C./h or higher, and further preferably 200° C./h or higher.

By applying this manufacturing method, the above-described microstructure defined in the present invention can be obtained.

In this manner, the steel for solid oxide fuel cells according to the present invention has excellent oxidation resistance, and therefore, for example, is suitable as various members for solid oxide fuel cells, such as a separator, an interconnector, a current collection component, an end plate, a current connection component, and a fastening bolt. This steel for solid oxide fuel cells can also be processed into various shapes for use. Examples of such shapes include net, thin wire, thin plates, strip materials, bar materials, members obtained by press-molding these, etched members, machined members, weld-bonded members, brazing-bonded members, metal or alloy-cladded members, and members obtained by performing a surface treatment to metal, alloy, or oxides.

EXAMPLES

Hereinafter, the present invention will be described in further detail by referring to examples. However, these examples do not limit the present invention.

A 10-kg steel ingot was prepared by vacuum melting, and subjected to forging and hot rolling. Then, the obtained product was repeatedly subjected to annealing and cold rolling to prepare a steel strip for solid oxide fuel cells which has a thickness of 0.5 mm. It is noted that intermediate annealing was performed at 820 to 950° C., and thereafter, final cold rolling of 50% was performed, followed by final annealing at 820 to 950° C.

The chemical compositions of example steels 1 to 12 which have the alloy composition within the range defined by the present invention, as well as of comparative example steels 21 to 26 which have the alloy composition outside the range defined by the present invention, are illustrated in Table 1. Impurity elements which are not indicated in Table 1, as well as alloys, were within the range of Mo≤0.2%, H≤0.0003%, B<0.001%, P≤0.04%, and S≤0.015%.

TABLE 1

| No | C | N | Zr | Ni | Cr | Si | Mn | Al | La | W | Cu | O (mass %) |
|---|---|---|---|---|---|---|---|---|---|---|---|---|
| 1 | 0.020 | 0.0220 | 0.32 | 0.51 | 23.61 | 0.05 | 0.27 | 0.08 | 0.06 | 1.99 | 0.96 | 0.0027 |
| 2 | 0.025 | 0.0431 | 0.47 | 0.53 | 23.94 | 0.05 | 0.27 | 0.09 | 0.09 | 2.02 | 0.97 | 0.0018 |
| 3 | 0.014 | 0.0196 | 0.24 | 0.51 | 24.19 | 0.07 | 0.28 | 0.08 | 0.06 | 1.95 | 1.00 | 0.0014 |
| 4 | 0.019 | 0.0027 | 0.24 | 0.51 | 24.19 | 0.07 | 0.28 | 0.10 | 0.06 | 1.95 | 1.01 | 0.0024 |
| 5 | 0.018 | 0.0114 | 0.25 | 0.52 | 24.16 | 0.07 | 0.28 | 0.05 | 0.06 | 1.96 | 1.00 | 0.0038 |
| 6 | 0.020 | 0.0147 | 0.24 | 0.52 | 24.24 | 0.07 | 0.28 | 0.06 | 0.05 | 1.97 | 1.00 | 0.0037 |
| 7 | 0.020 | 0.0180 | 0.25 | 0.52 | 24.17 | 0.07 | 0.29 | 0.07 | 0.06 | 1.98 | 1.01 | 0.0032 |
| 8 | 0.015 | 0.0047 | 0.30 | 0.51 | 24.11 | 0.06 | 0.28 | 0.08 | 0.07 | 1.95 | 1.00 | 0.0038 |
| 9 | 0.008 | 0.0011 | 0.23 | 0.51 | 24.00 | 0.08 | 0.29 | 0.07 | 0.06 | 1.93 | 1.00 | 0.0032 |
| 10 | 0.011 | 0.0222 | 0.26 | 0.50 | 22.53 | 0.07 | 0.48 | 0.07 | 0.07 | — | — | 0.0025 |
| 11 | 0.018 | 0.0032 | 0.25 | 0.51 | 22.50 | 0.07 | 0.49 | 0.07 | 0.08 | — | — | 0.0052 |
| 12 | 0.020 | 0.0166 | 0.28 | 0.51 | 22.53 | 0.07 | 0.47 | 0.09 | 0.06 | — | — | 0.0012 |
| 21 | 0.019 | 0.0529 | 0.66 | 0.53 | 23.97 | 0.04 | 0.28 | 0.11 | 0.08 | 1.95 | 1.01 | 0.0020 |
| 22 | 0.026 | 0.0207 | 0.52 | 0.52 | 23.97 | 0.05 | 0.28 | 0.12 | 0.08 | 1.96 | 1.01 | 0.0034 |
| 23 | 0.026 | 0.0229 | 0.53 | 0.52 | 23.90 | 0.05 | 0.29 | 0.13 | 0.08 | 1.96 | 1.00 | 0.0030 |
| 24 | 0.021 | 0.0170 | 0.55 | 0.53 | 23.94 | 0.05 | 0.28 | 0.12 | 0.06 | 1.95 | 1.01 | 0.0031 |
| 25 | 0.006 | 0.0169 | 0.54 | 0.50 | 23.71 | 0.04 | 0.28 | 0.11 | 0.07 | 1.88 | 0.97 | 0.0026 |
| 26 | 0.023 | 0.0360 | 0.18 | 0.01 | 22.17 | 0.06 | 0.49 | 0.04 | 0.03 | — | — | 0.0056 |

*1. The remainder other than the above elements is Fe and unavoidable impurities.
*2. "—" indicates "not added".

Subsequently, based on these C and N amounts, the range of Zr defined by relational formula (1) was calculated, and compared with the Zr content. Also, the relationship between the Zr content and Zr/(C+6/7N) was compared. The result is illustrated in Table 2 and FIG. 1. It is noted that the colored portion in FIG. 1 indicates the composition range of the steel for solid oxide fuel cells according to the present invention.

TABLE 2

| No | C | N | Zr | Zr lower limit | Zr upper limit (mass %) |
|---|---|---|---|---|---|
| 1 | 0.020 | 0.0220 | 0.32 | 0.23 | 0.45 |
| 2 | 0.025 | 0.0431 | 0.47 | 0.41 | 0.50 |
| 3 | 0.014 | 0.0196 | 0.24 | 0.18 | 0.42 |
| 4 | 0.019 | 0.0027 | 0.24 | 0.11 | 0.36 |
| 5 | 0.018 | 0.0114 | 0.25 | 0.16 | 0.40 |

TABLE 2-continued

| No | C | N | Zr | Zr lower limit | Zr upper limit (mass %) |
|---|---|---|---|---|---|
| 6 | 0.020 | 0.0147 | 0.24 | 0.19 | 0.42 |
| 7 | 0.020 | 0.0180 | 0.25 | 0.20 | 0.43 |
| 8 | 0.015 | 0.0047 | 0.30 | 0.10 | 0.34 |
| 9 | 0.008 | 0.0011 | 0.23 | 0.05 | 0.23 |
| 10 | 0.011 | 0.0222 | 0.26 | 0.17 | 0.41 |
| 11 | 0.018 | 0.0032 | 0.25 | 0.11 | 0.36 |
| 12 | 0.020 | 0.0166 | 0.28 | 0.20 | 0.43 |
| 21 | 0.019 | 0.0529 | 0.66 | 0.43 | 0.50 |
| 22 | 0.026 | 0.0207 | 0.52 | 0.27 | 0.46 |
| 23 | 0.026 | 0.0229 | 0.53 | 0.28 | 0.47 |
| 24 | 0.021 | 0.0170 | 0.55 | 0.21 | 0.44 |
| 25 | 0.006 | 0.0169 | 0.54 | 0.11 | 0.36 |
| 26 | 0.023 | 0.0360 | 0.18 | 0.34 | 0.48 |

*1. The lower limit value is calculated by $5(7C + 6N)/(7 - 4(7C + 6N))$.
*2. The upper limit is calculated by $41(7C + 6N)/(7 + 66(7C + 6N))$.

From the above-described steel for solid oxide fuel cells which has a thickness of 0.5 mm, a test piece of 15 mm (w)×15 mm (1)×0.5 mm (t) was cut out. The test piece was subjected to an oxidation treatment in the atmosphere at 850° C. for 1000 hours. The weights before and after the oxidation were measured, and evaluated for oxidation resistance. The result is illustrated in Table 3.

TABLE 3

| No. | Oxidation weight gain at 850° C. × 1000 h (mg/cm$^2$) | Visual field area ratio of Fe and Zr-containing intermetallic compound |
|---|---|---|
| 1 | 0.68 | 0.25% |
| 2 | 0.76 | 0.43% |
| 3 | 0.86 | 0.16% |
| 4 | 0.70 | 0.40% |
| 5 | 0.82 | 0.24% |
| 6 | 0.84 | 0.25% |
| 7 | 0.88 | 0.13% |
| 8 | 0.77 | 1.00% |
| 9 | 0.84 | 0.90% |
| 10 | 1.03 | 0.10% |
| 11 | 1.04 | 0.21% |
| 12 | 1.00 | 0.15% |
| 21 | 1.05 | 1.22% |
| 22 | 1.06 | 1.15% |
| 23 | 1.05 | 1.33% |
| 24 | 1.17 | 1.22% |
| 25 | 1.05 | 1.27% |
| 26 | 1.35 | 0.11% |

Subsequently, the cross-sectional microstructure of the test piece before oxidation for each of Nos. 1 to 12 which are defined by the present invention and Nos. 21 to 26 which are comparative examples was observed by EPMA. Then, the visual field area ratio of an Fe and Zr-containing intermetallic compound viewed within 0.25 mm$^2$ was studied.

Figure 2:
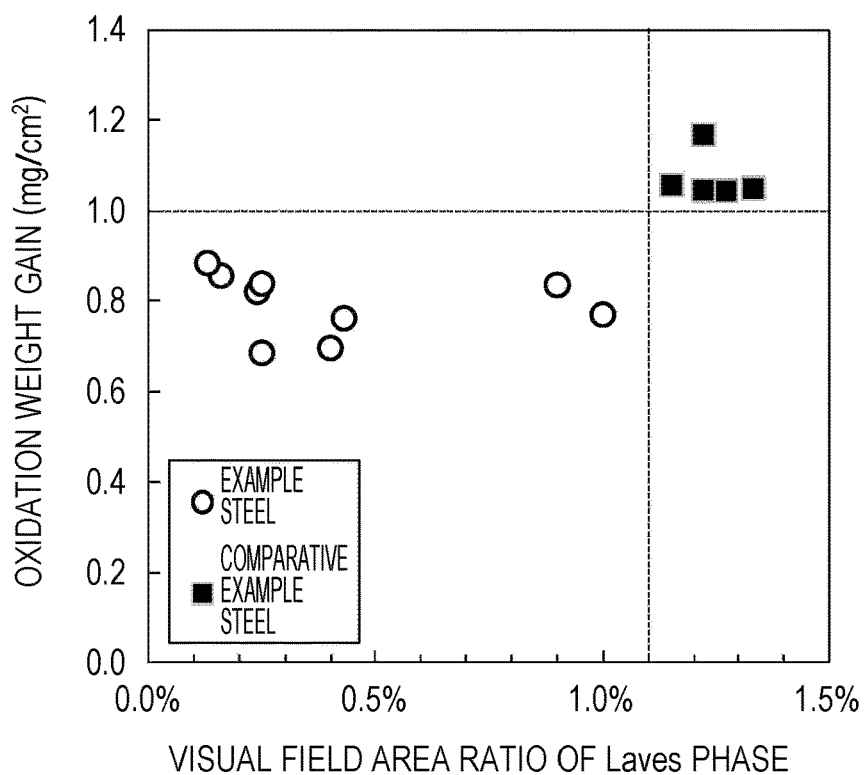
FIG. 2 is a diagram illustrating the relationship between the visual field area ratio of an Fe and Zr-containing intermetallic compound (Laves phase) and the oxidation weight gain.

A used material is the above-described steel for solid oxide fuel cells having a thickness of 0.5 mm. Five points in the vicinity of the center in the thickness direction were analyzed at an observation magnification of 400 times. The visual field area ratio of the Fe and Zr-containing intermetallic compound was measured by image analysis. The result is illustrated in Table 3. Also, FIG. 2 illustrates both of the oxidation weight gain after the oxidation treatment in the atmosphere at 850° C. for 1000 hours and the visual field area ratio of the Fe and Zr-containing intermetallic compound, for Nos. 1 to 9 which satisfy the chemical composition defined by the present invention and have the higher Cr content among others, and Nos. 21 to 25 in which the Zr amount is more than the chemical composition defined by the present invention.

Apparently, the steel for solid oxide fuel cells according to each of Nos. 1 to 12 which satisfy the range of the chemical composition defined by the present invention is a thin plate-like test piece having a thickness of 0.5 mm, has an oxidation weight gain which is lower than those of comparative example steels 21 to 26, and is excellent in oxidation resistance. Also, when comparing Nos. 1 to 9 and comparative example steel Nos. 21 to 25, which contain approximately equal amounts of Cr, W, Mn and Cu, the oxidation weight gain is higher in comparative example steel Nos. 21 to 25 in which 1.1% or more of the Fe and Zr-containing intermetallic compound was observed, than in the steel according to the present invention in which comparable amounts of Cr, W, Mn and Cu are contained. It is apparent that the presence of the intermetallic compound impairs oxidation resistance.

Also, as understood from Table 3, when the relational formula is satisfied, the visual field area ratio of the Fe and Zr-containing intermetallic compound in the microstructure becomes 1.1% or less, even when the contents of Cr and Mn are different. Particularly, Nos. 10 to 12 contain a large amount of Mn, and does not contain W. Therefore, Nos. 10 to 12, among the present examples, have a composition which is likely to cause the deterioration of oxidation resistance. However, it is understood that when the visual field area ratio of the Fe and Zr-containing intermetallic compound in the microstructure is 1.1% or less, the oxidation resistance equal to or higher than comparative example steel Nos. 21 to 25 is exhibited.

On the other hand, in comparative example steel No. 26, the composition is outside the range defined by the present invention, and the Zr amount itself is also insufficient. Accordingly, the amounts of C and N in the alloy matrix phase cannot be sufficiently reduced. It is considered that this causes unfavorable oxidation resistance.

The invention claimed is:

1. A steel for solid oxide fuel cells, comprising more than 0 and not more than 0.05 mass % of C, 0.050 mass % or less of N, 0.01 mass % or less of O, 0.15 mass % or less of Al, 0.15 mass % or less of Si, 0.1 to 1.0 mass % of Mn, 20.0 to 25.0 mass % of Cr, more than 0 mass % and not more than 1.0 mass % of Ni, 0.02 to 0.12 mass % of La, 0.1 to 0.5 mass % of Zr, 0.15 to 0.5 mass % of La+Zr, and Fe and impurities as a remainder, wherein the following relational formula is satisfied:

$$5(7C+6N)/(7-4(7C+6N)) \leq Zr \leq 41(7C+6N)/(7+66(7C+6N)),$$

and an Fe and Zr-containing intermetallic compound viewed in a ferrite matrix is 1.1% or less in terms of a visual field area ratio.

2. The steel for solid oxide fuel cells according to claim 1, wherein the steel for solid oxide fuel cells further comprises 0.5 to 2.0 mass % of Cu and 1.0 to 3.0 mass % of W, and contents of the Mn and the Cr are Mn: 0.1 to 0.4 mass % and Cr: 22.0 to 25.0 mass %.

3. The steel for solid oxide fuel cells according to claim 1, having a thickness of 0.5 mm or less.

4. The steel for solid oxide fuel cells according to claim 2, having a thickness of 0.5 mm or less.

5. A manufacturing method of a steel for solid oxide fuel cells, wherein the steel for solid oxide fuel cells containing more than 0 and not more than 0.05 mass % of C, 0.05 mass % or less of N, 0.01 mass % or less of O, 0.15 mass % or less of Al, 0.15 mass % or less of Si, 0.1 to 1.0 mass % of Mn, 20.0 to 25.0 mass % of Cr, more than 0 mass % and not more than 1.0 mass % of Ni, 0.02 to 0.12 mass % of La, 0.1 to 0.5 mass % of Zr, 0.15 to 0.5 mass % of La+Zr, and Fe and impurities as a remainder satisfies the following relational formula:

$$5(7C+6N)/(7-4(7C+6N)) \leq Zr \leq 41(7C+6N)/(7+66(7C+6N)),$$

and
 the manufacturing method comprises:
 a cold rolling step of performing cold rolling with a cold rolling material having the above-described composition;
 an intermediate annealing step of performing annealing at 800 to 1100° C.;
 repeating the cold rolling step and the intermediate annealing step, with cooling speed after the intermediate annealing being 50° C./h or higher; and
 a final annealing step of performing final annealing at 750 to 1050° C. to a cold-rolled material having been subjected to final cold rolling at a rolling ratio of 30% or more, with cooling speed after the final annealing being 50° C./h or higher, so that an Fe and Zr-containing intermetallic compound viewed in a ferrite matrix becomes 1.1% or less in terms of a visual field area ratio.

6. The manufacturing method of a steel for solid oxide fuel cells according to claim 5, wherein the steel for solid oxide fuel cells further comprises 0.5 to 2.0 mass % of Cu and 1.0 to 3.0 mass % of W, and contents of the Mn and the Cr are Mn: 0.1 to 0.4 mass % and Cr: 22.0 to 25.0 mass %.

\* \* \* \* \*